(12) United States Patent
Yang

(10) Patent No.: US 9,300,488 B2
(45) Date of Patent: Mar. 29, 2016

(54) AREA NETWORK SYSTEM AND NETWORK CONNECTION METHOD

(71) Applicant: Primax Electronics Ltd., Neihu, Taipei (TW)

(72) Inventor: Jung-Chang Yang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 181 days.

(21) Appl. No.: 14/079,255

(22) Filed: Nov. 13, 2013

(65) Prior Publication Data

US 2015/0063204 A1 Mar. 5, 2015

(30) Foreign Application Priority Data

Aug. 30, 2013 (TW) .............................. 102131354 A

(51) Int. Cl.
| | |
|---|---|
| H04W 4/00 | (2009.01) |
| H04L 12/28 | (2006.01) |
| H04L 12/701 | (2013.01) |
| H04L 12/715 | (2013.01) |
| H04L 12/741 | (2013.01) |
| H04L 29/12 | (2006.01) |

(52) U.S. Cl.
CPC ............ *H04L 12/2803* (2013.01); *H04L 45/00* (2013.01); *H04L 45/64* (2013.01); *H04L 45/745* (2013.01); *H04L 61/20* (2013.01); *H04L 61/2007* (2013.01); *H04L 61/2038* (2013.01)

(58) Field of Classification Search
CPC . H04W 76/022; H04L 12/2803; H04L 45/00; H04L 45/64; H04L 45/745; H04L 61/20; H04L 61/207; H04L 61/2038
USPC ................................................... 370/310, 328
See application file for complete search history.

(56) References Cited

U.S. PATENT DOCUMENTS

| | | | | |
|---|---|---|---|---|
| 2012/0023206 | A1* | 1/2012 | Kusama et al. ................ | 709/220 |
| 2012/0257540 | A1* | 10/2012 | Ichikawa ....................... | 370/254 |
| 2012/0257621 | A1* | 10/2012 | Ishii et al. ..................... | 370/389 |
| 2013/0003749 | A1* | 1/2013 | Murphy et al. ............... | 370/401 |
| 2014/0126576 | A1* | 5/2014 | Kumagai et al. .............. | 370/392 |
| 2014/0244810 | A1* | 8/2014 | Chen et al. .................... | 709/221 |

* cited by examiner

*Primary Examiner* — Chi H Pham
*Assistant Examiner* — Robert Lopata
(74) *Attorney, Agent, or Firm* — Kirton McConkie; Evan R. Witt

(57) ABSTRACT

A network connection method is provided. Firstly, plural communication address data and plural connecting port data are automatically transmitted from plural devices of an area network group to a connection module according to the UPnP protocol and the DLNA protocol. A communication address look-up table is created by the connection module of the passive electronic device according to the communication address data and the plural connecting port data. In addition, the communication address look-up table is transmitted to a network router of the area network group. Consequently, a controlling device can be connected to a passive electronic device of the area network group. Consequently, it is not necessary to input the communication address data and the connecting port data through manual settings.

12 Claims, 6 Drawing Sheets

AREA NETWORK SYSTEM AND NETWORK CONNECTION METHOD

FIELD OF THE INVENTION

The present invention relates to a network connection method for connecting with an area network group, and more particularly to a network connection method for connecting with an electronic device of an area network group.

BACKGROUND OF THE INVENTION

Generally, an area network group comprises a local area network (LAN), a metropolitan area network (MAN) and a wide area network (WAN). With increasing development of science and technology, the area network group further comprises a universal plug and play (UPnP) group and a Digital Living Network Alliance (DLNA). For example, the Digital Living Network Alliance (DLNA) is an alliance organization that is composed by the manufacturers of consumer electronics products, mobile phones and computers. The DLNA is responsible for defining unified transmission specifications to allow a variety of products from different manufacturers to be connected and communicated with each other. Consequently, a first electronic device and a second electronic device that comply with the DLNA protocol can be in direct communication with each other in order to transfer data or make synchronization actions.

First of all, some DLNA architectures will be illustrated as followed. FIG. 1 schematically illustrates a first conventional DLNA architecture. As shown in FIG. 1, the first conventional DLNA architecture 1 comprises a network router 10, a digital media server (DMS) 11, and a digital media player (DMP) 12. The network router 10 is connected to an internet (not shown). In addition, the network router 10 is in communication with the digital media server 11 and the digital media player 12. Consequently, the communication between the digital media server 11 and the digital media player 12 is established through the network router 10. A media file 15 is stored in the digital media server 11. The media file 15 is for example an audio file, an image file or a video file. After the digital media player 12 is in communication with the digital media server 11, the digital media player 12 may search the media file 15 from the digital media server 11. After the media file 15 is selected by the user through the digital media player 12, the media file 15 is transmitted from the digital media server 11 to a temporary memory 121 of the digital media player 12. After the media file 15 is received by the digital media player 12, the media file 15 that is temporarily stored in the temporary memory 121 can be played by the digital media player 12.

FIG. 2 schematically illustrates a second conventional DLNA architecture. As shown in FIG. 2, the second conventional DLNA architecture 2 comprises a network router 20, a digital media server (DMS) 21, and a digital media renderer (DMR) 23. The communication between the digital media server 21 and the digital media renderer 23 is established through the network router 20. The digital media server 21 is used for storing a media file 25. In addition, the digital media server 21 further provides a control function of controlling operations of the digital media renderer 23. The digital media renderer 23 is used for receiving and playing the media file 25 that is transmitted from the digital media server 21. After the control function of the digital media server 21 is utilized to select the stored media file 25 from the digital media server 21, the media file 25 is transmitted from the digital media server 21 to the digital media renderer 23. Consequently, the media file 25 can be played by the digital media renderer 23.

FIG. 3 schematically illustrates a third conventional DLNA architecture. As shown in FIG. 3, the third conventional DLNA architecture 2 comprises a network router 30, a digital media server (DMS) 31, a digital media renderer (DMR) 33, and a digital media controller (DMC) 34. The communication between the digital media server 31, the digital media renderer 33 and the digital media controller 34 is established through the network router 30. The digital media server 31 is used for storing a media file 35. The digital media renderer 33 is used for receiving and playing the media file 35 that is transmitted from the digital media server 31. The digital media controller 34 provides a control function. After the control function of the digital media controller 34 is utilized to select the stored media file 35 from the digital media server 31, the media file 35 is transmitted from the digital media server 31 to the digital media renderer 33. Consequently, the media file 35 can be played by the digital media renderer 33.

As mentioned above, the digital media server, the digital media controller, the digital media renderer and the digital media player that are included in the same network domain and comply with the DLNA protocol may transfer or play media files through the network router. The digital media server and the digital media renderer may be referred as passive electronic devices that can be controlled. Moreover, the digital media controller and the digital media player may be referred as active electronic devices that can control the passive electronic devices. For example, a user in a living room may allow a mobile phone to be connected to a computer host in a study room. Moreover, through the mobile phone, the user may browse the audio files in the computer and select a desired audio file from the computer. Then, the selected audio file is transmitted from the mobile phone to a stereo device in the living room. After the audio file is received by the stereo set, the audio file is played by the stereo device. Consequently, the purposes of conveniently and quickly sharing media contents can be achieved.

The above method of sharing media contents is not only applied to the same area network group. When the user intends to connect an external active electronic device to the network area, the user has to previously input the internal network communication address data and the connecting port data of the passive electronic device into the network router of the area network group through manual settings. After the manual settings are completed, the user may issue a control command to the network router of the area network group according to the internet communication address data of the network router and the connecting port data of the passive electronic device to be controlled. Moreover, the network router issues the control command to the passive electronic device according to the connecting port data of the passive electronic device. Consequently, the passive electronic device executes a corresponding controlled task according to the control command.

However, the method of manually inputting associated data into the network router through manual settings may result in two drawbacks. Firstly, it is difficult for most users to realize the internet communication address data, the internal network communication address data and the connecting port data. Consequently, the method of manually inputting associated data through manual settings is very complicated to most users. Generally, the setting procedure has to be performed by the professional engineers. Secondly, if a passive electronic device is newly added to the area network group or a passive electronic device in the area network group is turned off, the user has to manually add or delete the internal network communication address data and the connecting port data of the passive electronic device again. The way of repeatedly performing the manual setting procedure is not user-friendly.

Therefore, there is a need of providing an area network system and a network connection method without manual settings.

SUMMARY OF THE INVENTION

The present invention provides an area network system and a network connection method without manual settings.

In accordance with an aspect of the present invention, there is provided a network connection method for connecting a controlling device to at least one passive electronic device of an area network group. The network connection method includes the following steps. In a step (A), a connection module of the area network group receives an internet communication address data from a network router of the area network group and at least one internal network communication address data and at least one connecting port data from the at least one passive electronic device. In a step (B), the connection module creates a communication address look-up table according to the internet communication address data, the at least one internal network communication address data and the at least one connecting port data, and transmits the communication address look-up table to the network router. In a step (C), a control command is transmitted from the controlling device to the area network group according to the internet communication address data and the at least one connecting port data, and the control command is transmitted from the network router to the at least one passive electronic device according to the internet communication address data, the at least one connecting port data and the communication address look-up table.

In accordance with another aspect of the present invention, there is provided an area network system. The area network system includes a controlling device and an area network group. The controlling device issues a control command according to an internet communication address data and at least one connecting port data. The area network group is connected to the controlling device through network connection. The area network group includes a network router, at least one passive electronic device, and a connection module. The network router is connected to the controlling device through network connection to provide a network connection function and receive the control command, wherein the internet communication address data is previously stored in the network router. The at least one passive electronic device is connected to the network router through network connection. An internal network communication address data and a corresponding connecting port data of the at least one connecting port data are previously stored in each of the at least one passive electronic device. The connection module is connected to the network router through network connection for creating a communication address look-up table according to the internet communication address data, the at least one internal network communication address data and the at least one connecting port data, and transmitting the communication address look-up table to the network router. When the control command is received by the network router, the control command is transmitted from the network router to the at least one passive electronic device according to the internet communication address data, the at least one connecting port data and the communication address look-up table.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For eliminating the drawbacks of the conventional technology, the present invention provides a network connection method for connecting with an area network group and an area network system using the network connection method of the present invention.

Figure 1:
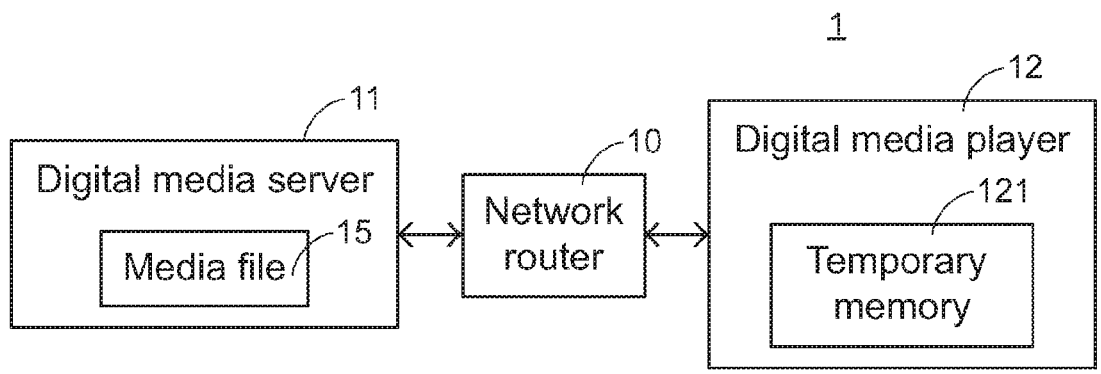
FIG. 1 schematically illustrates a first conventional DLNA architecture.
Figure 2:
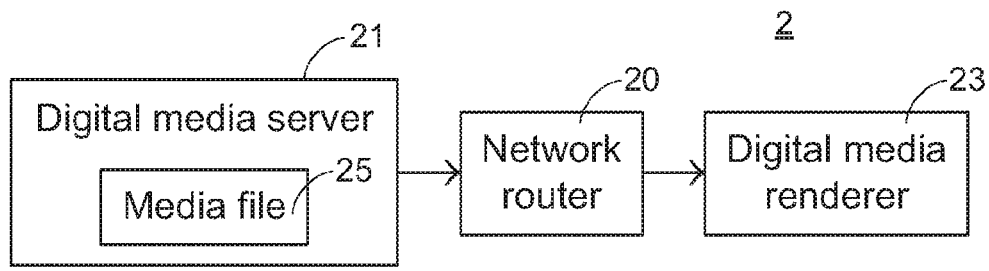
FIG. 2 schematically illustrates a second conventional DLNA architecture.
Figure 3:
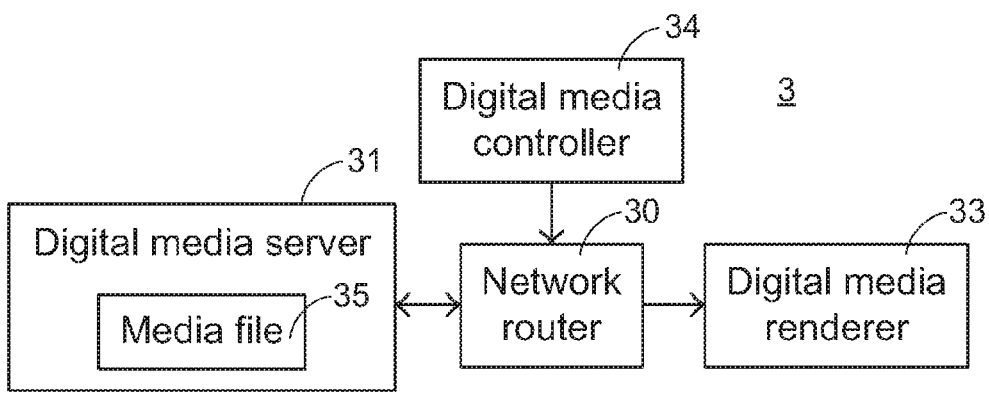
FIG. 3 schematically illustrates a third conventional DLNA architecture.
Figure 4:
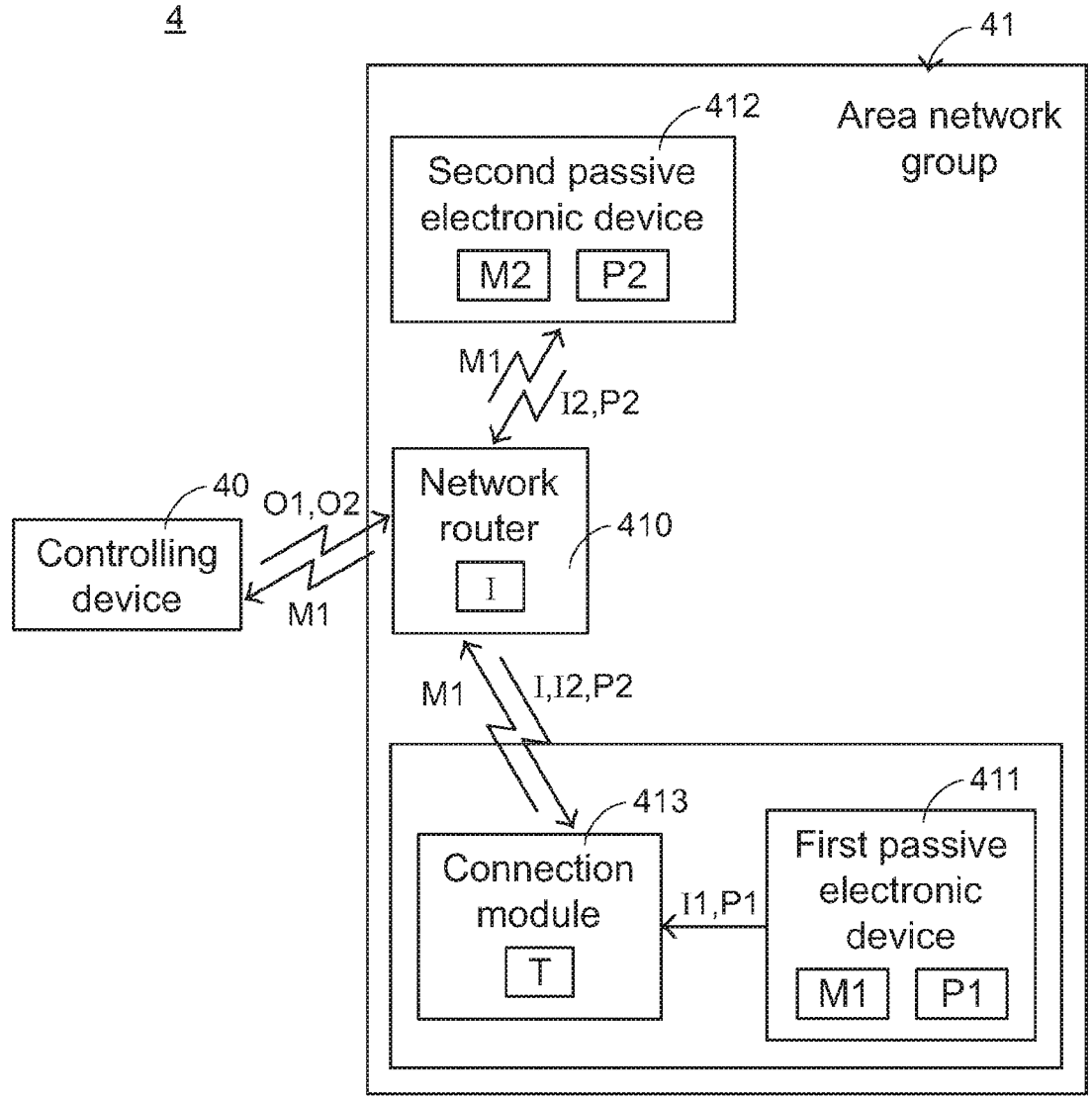
FIG. 4 is a schematic functional block diagram illustrating an area network system according to an embodiment of the present invention.

Hereinafter, an area network system of the present invention will be illustrated. FIG. 4 is a schematic functional block diagram illustrating an area network system according to an embodiment of the present invention. As shown in FIG. 4, the area network system 4 comprises a controlling device 40 and an area network group 41. The area network group 41 is connected to the controlling device 40 through network connection. The area network group 41 comprises a network router 410, a first passive electronic device 411, a second passive electronic device 412, and a connection module 413. The network router 410 is used to provide a network connection function. Through the network router 410, the first passive electronic device 411 and the second passive electronic device 412 are connected with each other through network connection. In this embodiment, the connection module 413 is a software component and included in the first passive electronic device 411. Moreover, the network router 410 complies with the universal plug and play (UPnP) protocol. Moreover, both of the first passive electronic device 411 and the second passive electronic device 412 comply with the Digital Living Network Alliance (DLNA) protocol. In an embodiment, the first passive electronic device 411 is a digital media server, and the second passive electronic device 412 is a digital media renderer such as a stereo device or a display screen.

Figure 5:
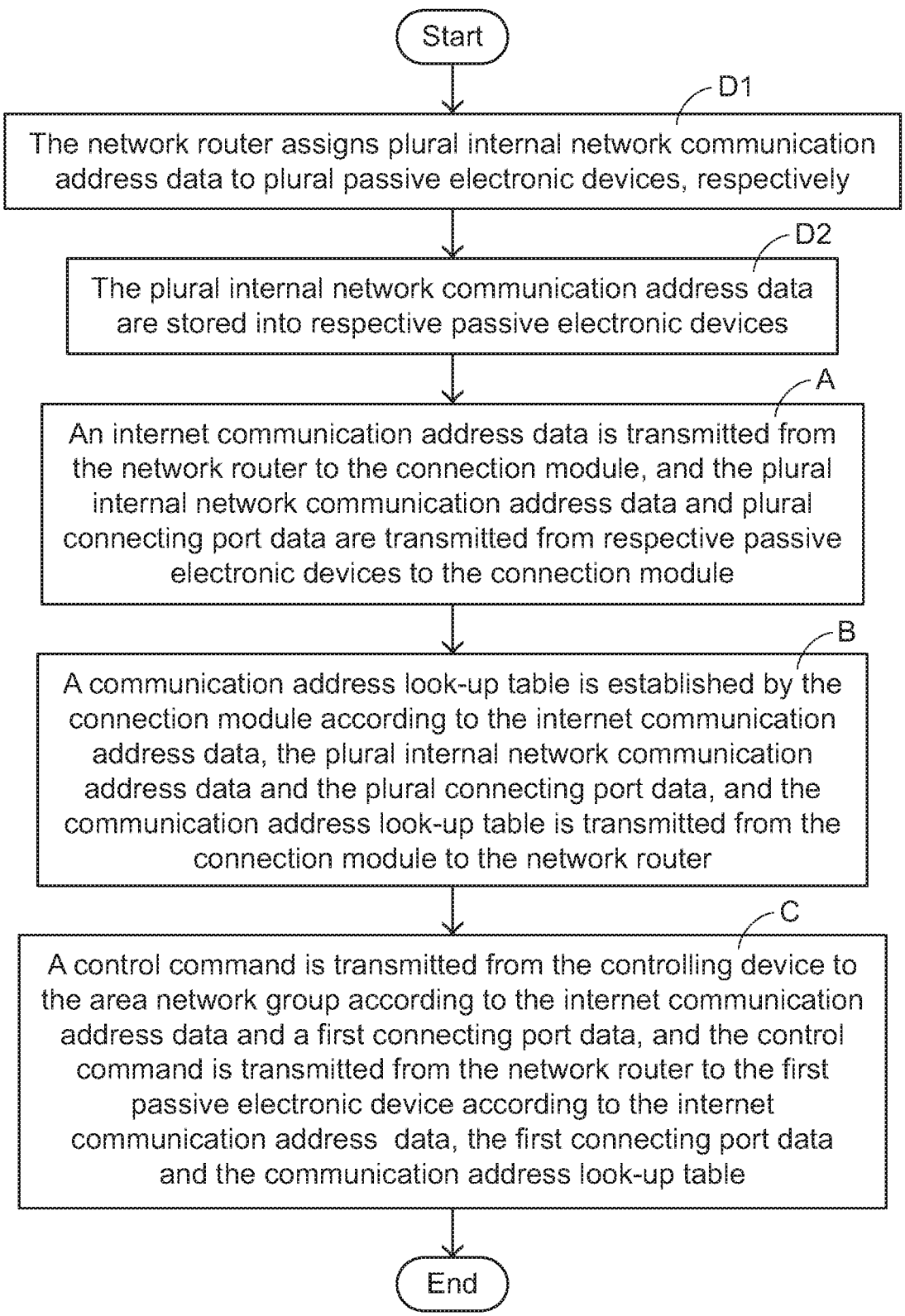
FIG. 5 is a flowchart illustrating a network connection method according to an embodiment of the present invention.

Hereinafter, a network connection method for connecting with an area network group according to the present invention will be illustrated with reference to FIG. 5. FIG. 5 is a flowchart illustrating a network connection method according to an embodiment of the present invention.

Firstly, in the step (D1), the network router assigns plural internal network communication address data to plural passive electronic devices, respectively. In the step (D2), the plural internal network communication address data are stored into respective passive electronic devices. In the step (A), an internet communication address data is transmitted from the network router to the connection module, and the plural internal network communication address data and plural connecting port data are transmitted from respective passive electronic devices to the connection module. In the step (B), a communication address look-up table is created by the connection module according to the internet communication address data, the plural internal network communication address data and the plural connecting port data, and the communication address look-up table is transmitted from the connection module to the network router. In the step (C), a control command is transmitted from the controlling device to the area network group according to the internet communication address data and a first connecting port data, and the control command is transmitted from the network router to the first passive electronic device according to the internet communication address data, the first connecting port data and the communication address look-up table.

Hereinafter, the detailed procedures of the steps (D1)~(D2) performed by the area network system 4 of the present invention will be illustrated with reference to FIGS. 4 and 5. A first connecting port data P1 is previously stored in the first passive electronic device 411. For example, the first connecting port data P1 is 1000. A second connecting port data P2 is previously stored in the second passive electronic device 412. For example, the second connecting port data P2 is 500. Then, the step (D1) is performed by the network router 410. For example, the network router 410 assigns a first internal network communication address data I1 to the first passive electronic device 411 and assigns a second internal network communication address data I2 to the second passive electronic device 412. Then, the step (D2) is performed by the first passive electronic device 411 and the second passive electronic device 412. That is, the first internal network communication address data I1 is stored into the first passive electronic device 411, and the second internal network communication address data I2 is stored into the second passive electronic device 412. Moreover, an internet communication address data I is previously stored in the network router 410. In this embodiment, the internet communication address data I is an internet protocol address (IP address), and the first internal network communication address data I1 and the second internal network communication address data I2 are communication addresses of the internal network. For example, the internet communication address data I is 168.10.20.30, the first internal network communication address data I1 is 10.1.1.1, and the second internal network communication address data I2 is 10.1.1.2.

In this embodiment, the internet communication address data I is assigned to the network router 410 by an internet service provider, and the first internal network communication address data I1 and the second internal network communication address data I2 are respectively assigned to the first passive electronic device 411 and the second passive electronic device 412 by the network router 410. Furthermore, the internet communication address data I is used for allowing the connecting device 40 to be connected to the area network group 41 through network connection. That is, the connecting device 40 may be connected to the network router 410 through network connection according to the internet communication address data I (e.g. 168.10.20.30). The first internal network communication address data I1 and the second internal network communication address data I2 are used for establishing internal connection in the area network group 41. That is, any device in the area network group 41 may be connected to the first passive electronic device 411 through network connection according to the first internal network communication address data I1 (e.g. 10.1.1.1) and the first connecting port data P1, and any device in the area network group 41 may be connected to the second passive electronic device 412 through network connection according to the second internal network communication address data I2 (e.g. 10.1.1.2) and the second connecting port data P2.

Figure 6:
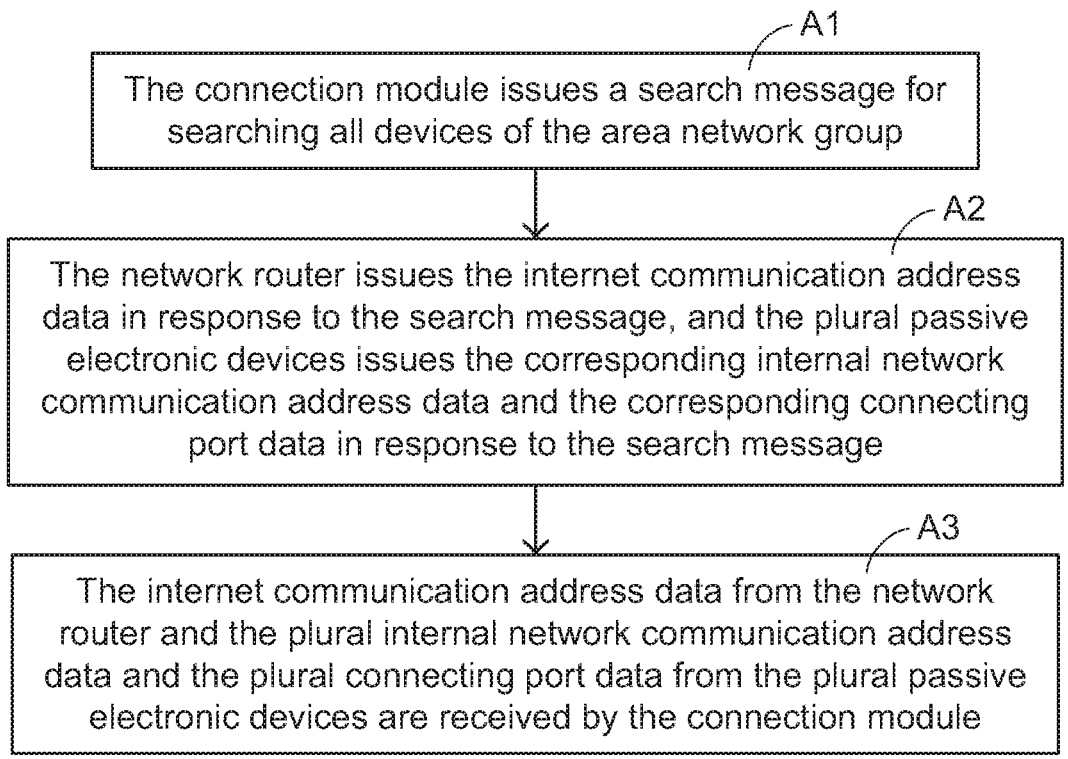
FIG. 6 is a flowchart illustrating the step (A) of the network connection method according to an embodiment of the present invention.

After the step (D2), the step (A) is performed by the area network system 4. Hereinafter, the detailed procedure of the step (A) performed by the area network system 4 will be illustrated with reference to FIGS. 4 and 6. FIG. 6 is a flowchart illustrating the step (A) of the network connection method according to an embodiment of the present invention. The step (A) comprises the following sub-steps. In the sub-step (A1), the connection module issues a search message for searching all devices of the area network group. In the sub-step (A2), the network router issues the internet communication address data according to the search message, and the plural passive electronic devices issues the corresponding internal network communication address data and the corresponding connecting port data according to the search message. In the sub-step (A3), the internet communication address data from the network router and the plural internal network communication address data and the plural connecting port data from the plural passive electronic devices are received by the connection module.

In particular, the sub-steps (A1)~(A3) are the procedures of transmitting data to the connection module 413 by the area network system 4. When the area network system 4 intends to establish the internal connection of the area network group 41, the connection module 413 issues a search message (not shown) in a broadcasting form so as to search all devices of the area network group 41 (i.e. the step (A1) is performed by the connection module 413). After the search message is received by the network router 410, the internet communication address data I is transmitted from the network router 410 to the connection module 413 in a network transmission manner. On the other hand, after the search message is received by the first passive electronic device 411, the first internal network communication address data I1 and the first connecting port data P1 are transmitted from the first passive electronic device 411 to the connection module 413 through internal connection. Similarly, after the search message is received by the second passive electronic device 412, the second internal network communication address data I2 and the second connecting port data P2 are transmitted from the second passive electronic device 412 to the connection module 413 through network transmission (i.e. the step (A2) is performed by the network area 41). Then, the internet communication address data I, the first internal network communication address data I1, the first connecting port data P1, the second internal network communication address data I2 and the second connecting port data P2 are received by and stored into the connection module 413 (i.e. the step (A3) is performed by the connection module 413). Under this circumstance, the internet communication address data I, the first internal network communication address data I1, the first connecting port data P1, the second internal network communication address data I2 and the second connecting port data P2 are acquired by the connection module 413.

By the way, the device of the UPnP group that complies with the UPnP protocol should respond to the search message after the search message is received. Similarly, the passive electronic device that complies with the DLNA protocol should respond to the search message after the search message is received. In accordance with the present invention, the area network system 4 complies with the UPnP protocol and the DLNA protocol. Consequently, in the area network group 41, the data for connection is transmitted from the network router 410, the first passive electronic device 411 and the second passive electronic device 412 to the connection module 413, but is not limited thereto.

Figure 7:
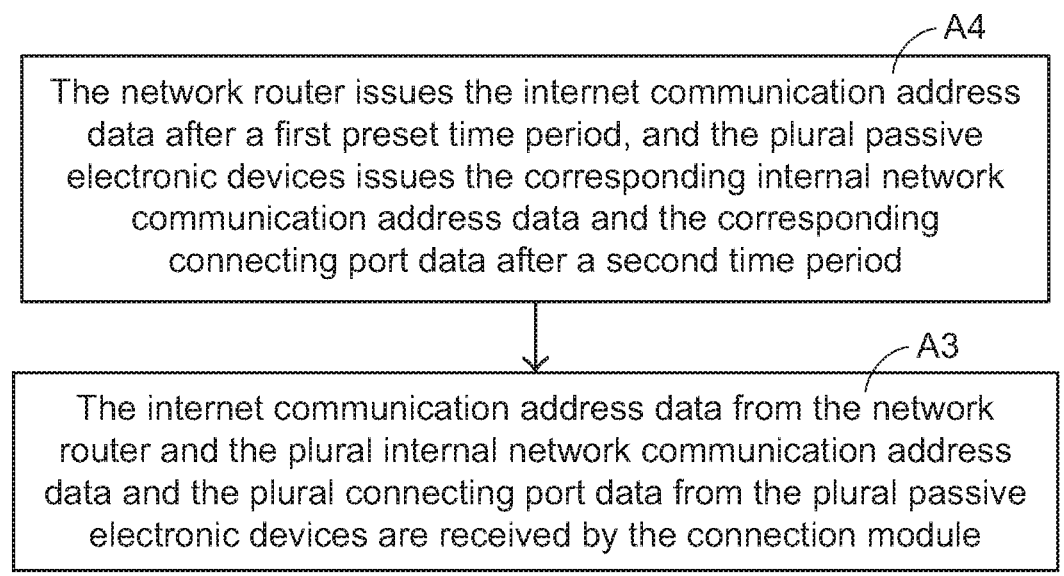
FIG. 7 is a flowchart illustrating the step (A) of the network connection method according to another embodiment of the present invention.

Alternatively, in another embodiment, the step (A) comprises other sub-steps in replace of the sub-steps (A1)~(A3). FIG. 7 is a flowchart illustrating the step (A) of the network connection method according to another embodiment of the present invention. The step (A) comprises the following sub-steps.

In the sub-step (A4), the network router issues the internet communication address data after a first preset time period, and the plural passive electronic devices issues the corresponding internal network communication address data and the corresponding connecting port data after a second time period. In the sub-step (A3), the internet communication address data from the network router and the plural internal network communication address data and the plural connecting port data from the plural passive electronic devices are received by the connection module.

That is, the sub-step (A4) performed by the area network system 4 may be used to replace the sub-steps (A1)~(A2). According to the UPnP protocol, after the search message has not been received for a certain time period, the device of the UPnP group should output data to indicate that this device is still present in the UPnP group. On the other hand, if the data outputted from this device has not been received by another device for a certain time period, another device may realize that this device has been turned off or removed and is not present in the UPnP group. The above conditions are also applied to the device that complies with the DLNA protocol. By performing the sub-step (A4), the internal connection in the area network group can be established without the need of issuing the search message.

Figure 8:
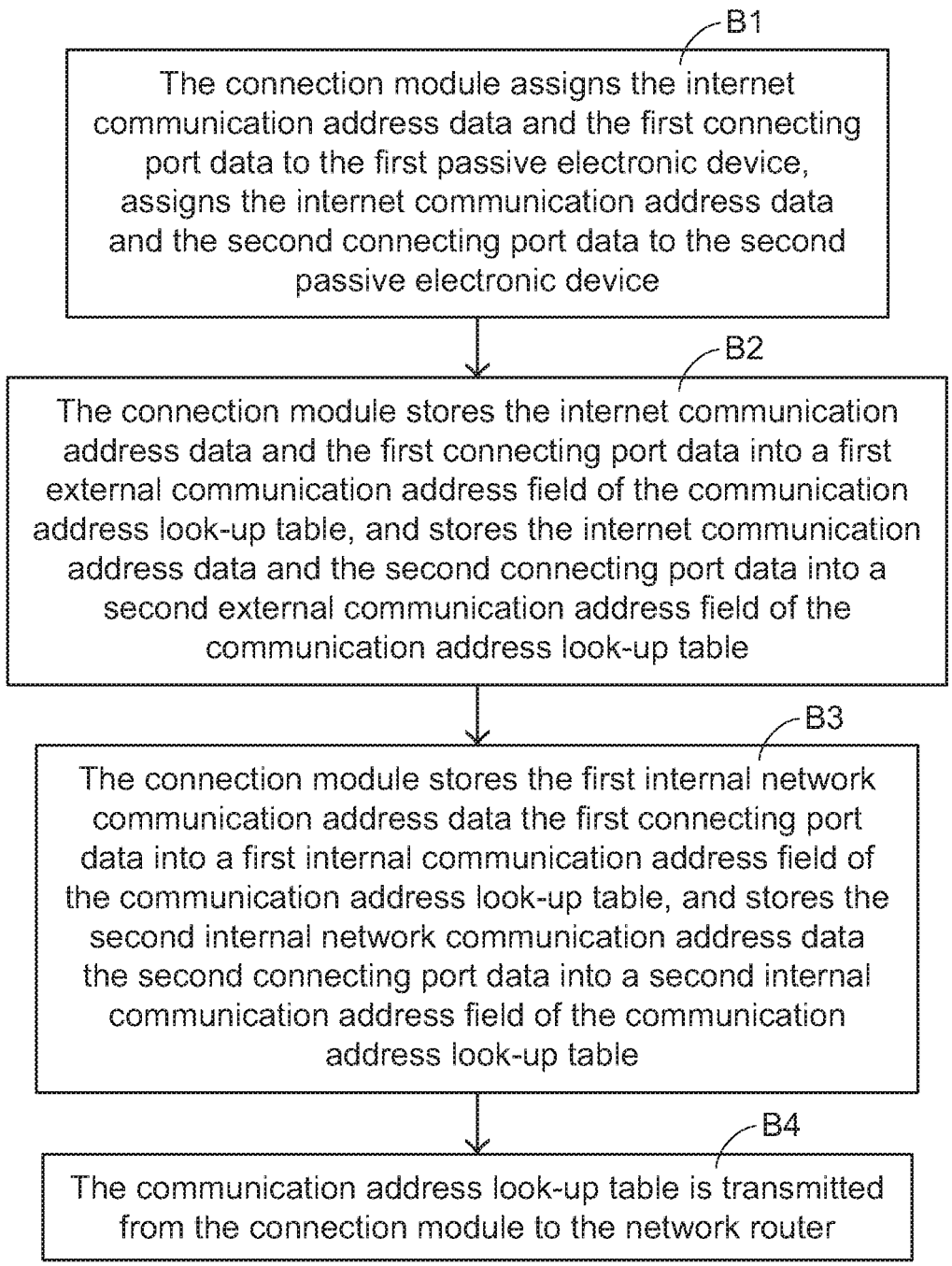
FIG. 8 is a flowchart illustrating the step (B) of the network connection method according to an embodiment of the present invention.
Figure 9:
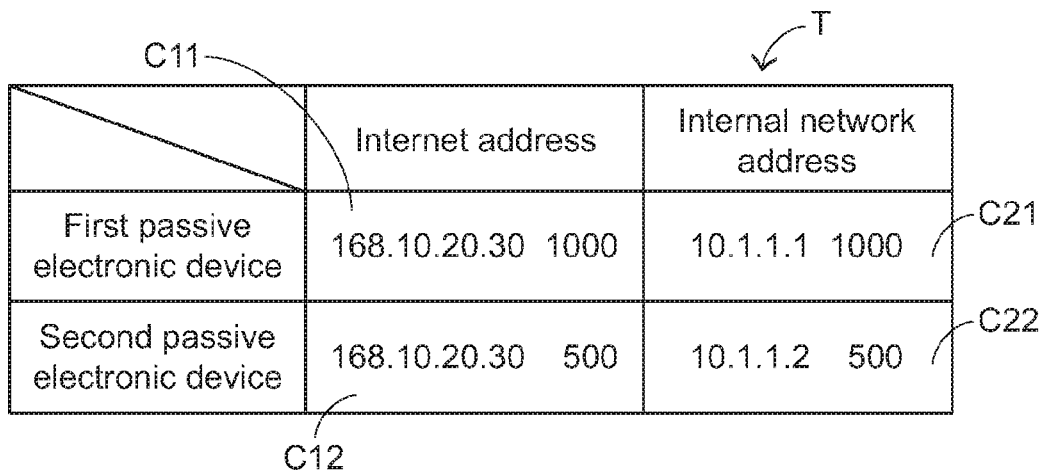
FIG. 9 schematically illustrates a communication address look-up table of the area network system according to an embodiment of the present invention.

Hereinafter, the detailed procedure of the step (B) will be illustrated with reference to FIGS. 8 and 9. FIG. 8 is a flowchart illustrating the step (B) of the network connection method according to an embodiment of the present invention. FIG. 9 schematically illustrates a communication address look-up table of the area network system according to an embodiment of the present invention. The step (B) comprises the following sub-steps. In the sub-step (B1), the connection module assigns the internet communication address data and the first connecting port data to the first passive electronic device, and assigns the internet communication address data and the second connecting port data to the second passive electronic device. In the sub-step (B2), the connection module stores the internet communication address data and the first connecting port data into a first external communication address field of the communication address look-up table, and stores the internet communication address data and the second connecting port data into a second external communication address field of the communication address look-up table. In the sub-step (B3), the connection module stores the first internal network communication address data and the first connecting port data into a first internal communication address field of the communication address look-up table, and stores the second internal network communication address data and the second connecting port data into a second internal communication address field of the communication address look-up table. In the sub-step (B4), the communication address look-up table is transmitted from the connection module to the network router.

The contents of the communication address look-up table T are shown in FIG. 9. The communication address look-up table T is established by the connection module 413 after the sub-steps (B1)~(B3) of the step (B) are performed. In the sub-step (B1), the connection module 413 assigns the internet communication address data I (i.e. 168.10.20.30) and the first connecting port data P1 (i.e. 1000) to the first passive electronic device 411, and assigns the internet communication address data I and the second connecting port data P2 (i.e. 500) to the second passive electronic device 412. For the user outside the area network group 41, the internet communication address data I and the first connecting port data P1 about the first passive electronic device 411 are "168.10.20.30, 1000", and the internet communication address data I and the second connecting port data P2 about the second passive electronic device 412 are "168.10.20.30, 500".

In the sub-step (B2), the connection module 413 stores the internet communication address data I and the first connecting port data P1 into a first external communication address field C11 of the communication address look-up table T, and stores the internet communication address data I and the second connecting port data P2 into a second external communication address field C12 of the communication address look-up table T.

In the sub-step (B3), the connection module 413 stores the first internal network communication address data I1 (i.e. 10.1.1.1) and the first connecting port data P1 into a first internal communication address field C21 of the communication address look-up table T, and stores the second internal network communication address data I2 (i.e. 10.1.1.2) and the second connecting port data P2 into a second internal communication address field C22 of the communication address look-up table T. Both of the first external communication address field C11 and the first internal communication address field C21 contain the first connecting port data P1. Consequently, the first external communication address field C11 corresponds to the first internal communication address field C21. Similarly, the second external communication address field C12 corresponds to the second internal communication address field C22.

After the above procedures are completed, the communication address look-up table T is created. If the area network group 41 contains any additional passive electronic device, the above procedures for the additional passive electronic device will performed, and these procedures are not redundantly described herein. After the communication address look-up table T is created, the communication address look-up table T is transmitted from the connection module 413 to the network router 410 (i.e. the sub-step (B4) is performed by the connection module 413). After the step (B) is completed, the controlling device 40 can be connected to the area network group 41 through network connection.

Figure 10:
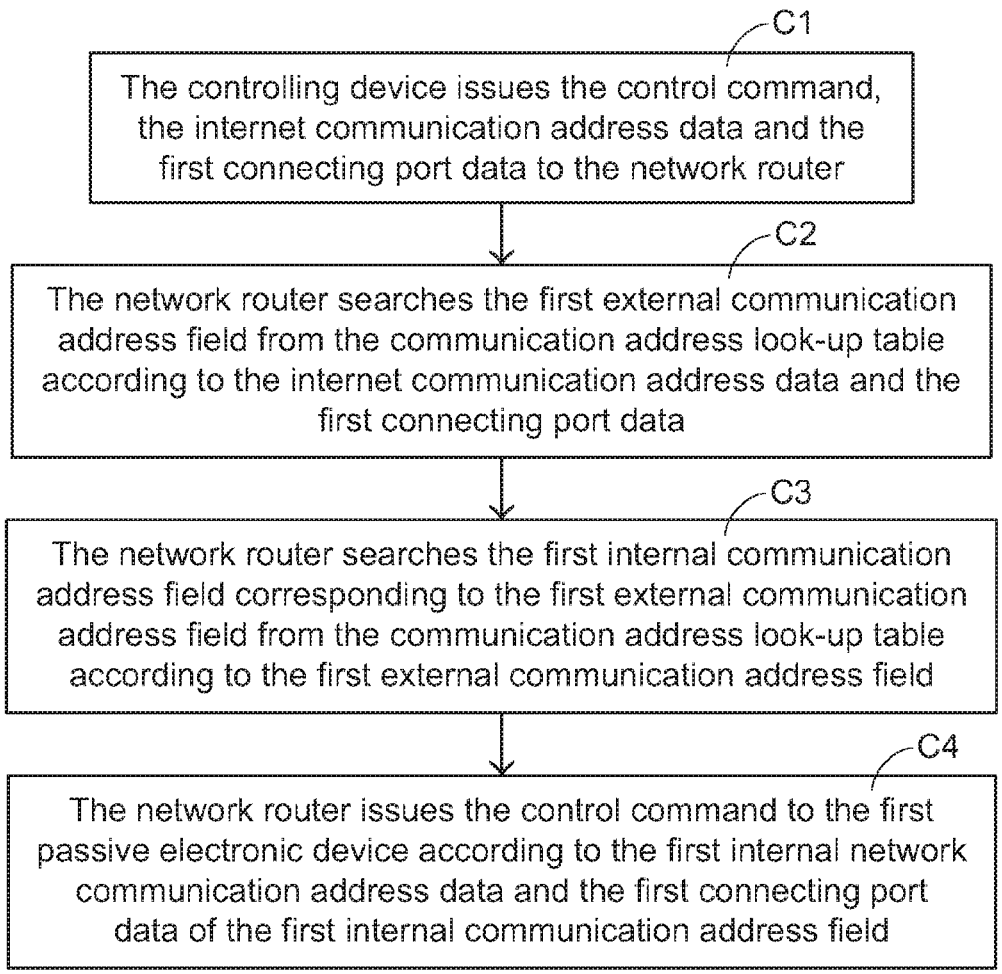
FIG. 10 is a flowchart illustrating the step (C) of the network connection method according to an embodiment of the present invention.

Hereinafter, the detailed procedure of the step (C) performed by the area network system 4 will be illustrated with reference to FIGS. 4 and 10. FIG. 10 is a flowchart illustrating the step (C) of the network connection method according to an embodiment of the present invention. The step (C) comprises the following sub-steps.

In the sub-step (C1), the controlling device issues the control command, the internet communication address data and the first connecting port data to the network router. In the sub-step (C2), the network router searches the first external communication address field from the communication address look-up table according to the internet communication address data and the first connecting port data. In the sub-step (C3), the network router searches the first internal communication address field corresponding to the first external communication address field from the communication address look-up table according to the first external communication address field. In the sub-step (C4), the network router issues the control command to the first passive electronic device according to the first internal network communication address data and the first connecting port data in the first internal communication address field.

When the user outside the area network group 41 intends to acquire a first media file M1 from the first passive electronic device 411, the user may operate the controlling device 40 to issue a first control command O1 to the first passive electronic device 411. That is, when the sub-step (C1) is performed by the controlling device 40, the controlling device 40 is connected to the network router 410 through network connection according to the internet communication address data I and the first connecting port data P1 (e.g. "168.10.20.30, 1000"). Then, the sub-step (C2) is performed by the network router 410. That is, the network router 410 searches the field containing the internet communication address data I and the first connecting port data P1 from the communication address look-up table T. The searching result is the first external communication address field C11. Then, the sub-step (C3) is performed by the network router 410. That is, after the first external communication address field C11 is searched by the network router 410, the network router 410 searches the first internal communication address field C21 corresponding to the first external communication address field C11 from the communication address look-up table T. Afterwards, the sub-step (C4) is performed by the network router 410. That is, the network router 410 issues the first control command O1 to the first passive electronic device 411 according to the first internal network communication address data I1 and the first connecting port data P1 (e.g. "10.1.1.1, 1000") of the first internal communication address field C21. After the step (C) is completed, the first passive electronic device 411 executes a corresponding controlled task according to the first control command O1. For example, if the first control command O1 is a transmission command, the first media file M1 is transmitted from the first passive electronic device 411 to the controlling device 40 or the second passive electronic device 412 according to the transmission command.

A process of controlling the second passive electronic device 412 by the controlling device 40 will be illustrated as follows. Please also refer to FIG. 4. When the user intends to play a second media file M2 of the second passive electronic device 412, the user may operate the controlling device 40 to issue a second control command O2 to the second passive electronic device 412. The controlling device 40 is connected to the network router 410 through network connection according to the internet communication address data I and the second connecting port data P2 (e.g. "168.10.20.30, 500"). Then, the network router 410 searches the field containing the internet communication address data I and the second connecting port data P2 from the communication address look-up table T. The search resulting is the second external communication address field C12. After the second external communication address field C12 is searched by the network router 410, the network router 410 searches the second internal communication address field C22 corresponding to the second external communication address field C12 from the communication address look-up table T. Then, the network router 410 issues the second control command O2 to the second passive electronic device 412 according to the second internal network communication address data I2 and the second connecting port data P2 (e.g. "10.1.1.2, 500") of the second internal communication address field C22. Afterwards, the second passive electronic device 412 executes a corresponding controlled task according to the second control command O2. For example, if the second control command O2 is a play command, the second media file M2 is played by the second passive electronic device 412 according to the play command.

Moreover, the area network system 4 may provide an automatic updating function. The automatic updating function complies with the DLNA protocol. For example, when a third passive electronic device (not shown) is newly added to the area network group 41, a third internal network communication address data and a third connecting port data corresponding to the third passive electronic device are automatically transmitted from the third passive electronic device to the connection module 413 according to the DLNA protocol. After the step (B) is performed by the connection module 413, a third external communication address field and a third internal communication address field corresponding to the third passive electronic device are added to the communication address look-up table T. In other words, when the third passive electronic device is newly added to the area network group 41, the third external communication address field and the third internal communication address field corresponding to the third passive electronic device are simultaneously added to the communication address look-up table T. On the other hand, if the second passive electronic device 412 is turned off, a device removable message is automatically generated. According to the device removable message, the second external communication address field C12 and the second internal communication address field C22 are corresponding to the second passive electronic device 412 are simultaneously removed from the communication address look-up table T by the connection module 413.

From the above descriptions, the present invention provides an area network system and a network connection method. Firstly, the internet communication address data, the plural internal network communication address data and the plural connecting port data are automatically transmitted to the connection module according to the UPnP protocol and the DLNA protocol. In addition, the communication address look-up table is created by the built-in connection module of the passive electronic device according to the above data. Consequently, it is not necessary to manually input the internet communication address data, the plural internal network communication address data and the plural connecting port data into the network router. Moreover, the communication address look-up table may be automatically updated when a passive electronic device is newly added or turned off. Consequently, whenever a passive electronic device is newly added or turned off by the user, it is not necessary to manually input the updated communication address data and the updated connecting port data into the passive electronic device. In other words, the area network system and the network connection method of the present invention are user-friendly while reducing the burden on the user.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A network connection method for connecting a controlling device to at least one passive electronic device of an area network group, one of the at least one passive electronic device executing a connection module of the area network group, the network connection method comprising steps of:
   (A) the connection module of the area network group receiving an internet communication address data from a network router of the area network group and at least one internal network communication address data and at least one connecting port data from the at least one passive electronic device;
   (B) the connection module creating a communication address look-up table according to the internet communication address data, the at least one internal network communication address data and the at least one connecting port data, and transmitting the communication address look-up table to the network router; and
   (C) transmitting a control command from the controlling device to the area network group according to the internet communication address data and the at least one connecting port data, and transmitting the control command from the network router to the at least one passive electronic device according to the internet communication address data, the at least one connecting port data and the communication address look-up table.

2. The network connection method according to claim 1, wherein the step (A) comprises sub-steps of:
   (A1) issuing a search message from the connection module;
   (A2) issuing the internet communication address data from the network router according to the search message, and outputting the at least one internal network communication address data and the at least one connecting port data from the at least one passive electronic device according to the search message; and
   (A3) the connection module receiving the internet communication address data from the network router and the at least one internal network communication address data and the at least one connecting port data from the at least one passive electronic device.

3. The network connection method according to claim 1, wherein the step (A) comprises sub-steps of:
   (A4) issuing the internet communication address data from the network router after a first preset time period, and issuing the at least internal network communication address data and the at least one connecting port data from the at least one passive electronic device after a second time period; and
   (A3) the connection module receiving the internet communication address data from the network router and the at least one internal network communication address data and the at least one connecting port data from the at least one passive electronic device.

4. The network connection method according to claim 1, wherein before the step (A), the network connection method further comprises steps of:
   (D1) the network router assigning the at least one internal network communication address data to the at least one passive electronic device, wherein the at least one connecting port data is previously stored in the at least one passive electronic device; and
   (D2) storing the internal network communication address data into the at least one passive electronic device.

5. The network connection method according to claim 1, wherein the step (B) comprises sub-steps of:
   (B1) the connection module assigning the internet communication address data and a first connecting port data of the at least one connecting port data to a first passive electronic device of the at least one passive electronic device, and assigning the internet communication address data and a second connecting port data of the at least one connecting port data to a second passive electronic device of the at least one passive electronic device;
   (B2) the connection module storing the internet communication address data and the first connecting port data into a first external communication address field of the communication address look-up table, and storing the internet communication address data and the second connecting port data into a second external communication address field of the communication address look-up table;
   (B3) the connection module storing a first internal network communication address data of the at least one internal network communication address data and the first connecting port data into a first internal communication address field of the communication address look-up table, and storing a second internal network communication address data of the at least one internal network communication address data and the second connecting port data into a second internal communication address field of the communication address look-up table, wherein the first external communication address field corresponds to the first internal communication address field, and the second external communication address field corresponds to the second internal communication address field; and
   (B4) transmitting the communication address look-up table from the connection module to the network router.

6. The network connection method according to claim 1, wherein the step (C) comprises sub-steps of:
   (C1) the network router receiving the control command, the internet communication address data and a first connecting port data of the at least one connecting port data from the controlling device;
   (C2) the network router searching a first external communication address field from the communication address look-up table according to the internet communication address data and the first connecting port data;
   (C3) the network router searching a first internal communication address field corresponding to the first external communication address field from the communication address look-up table according to the first external communication address field; and
   (C4) the network router issuing the control command to a first passive electronic device of the at least one passive electronic device according to a first internal network communication address data of the at least one internal network communication address data and the first connecting port data in the first internal communication address field, wherein the network router complies with a universal plug and play (UPnP) protocol, and the at least one passive electronic device complies with a Digital Living Network Alliance (DLNA) protocol.

7. An area network system, comprising:
   a controlling device issuing a control command according to an internet communication address data and at least one connecting port data; and
   an area network group connected to the controlling device through network connection, wherein the area network group comprises:

a network router connected to the controlling device through network connection to provide a network connection function and receive the control command, wherein the internet communication address data is previously stored in the network router;

at least one passive electronic device connected to the network router through network connection, wherein an internal network communication address data and a corresponding connecting port data of the at least one connecting port data are previously stored in each of the at least one passive electronic device; and a connection module executed by one of the at least one passive electronic device, the connection module being connected to the network router through network connection for creating a communication address look-up table according to the internet communication address data, the at least one internal network communication address data and the at least one connecting port data, and transmitting the communication address look-up table to the network router, wherein when the control command is received by the network router, the control command is transmitted from the network router to the at least one passive electronic device according to the internet communication address data, the at least one connecting port data and the communication address look-up table.

8. The area network system according to claim 7, wherein after the internet communication address data, a first internal network communication address data of the at least one internal network communication address data and a first connecting port data of the at least one connecting port data are received by the connection module, the connection module assigns the internet communication address data and the first connecting port data to a first external communication address field of the communication address look-up table and assigns the first internal network communication address data and the first connecting port data to a first internal communication address field of the communication address look-up table, wherein the first external communication address field corresponds to the first internal communication address field, and the first internal network communication address data and the first connecting port data correspond to a first passive electronic device of the at least one passive electronic device.

9. The area network system according to claim 8, wherein after the control command is received by the network router, the network router searches the first external communication address field from the communication address look-up table according to the internet communication address data and the first connecting port data and searches the first internal communication address field corresponding to the first external communication address field from the communication address look-up table, wherein the network router issues the control command to the first passive electronic device according to the first internal network communication address data and the first connecting port data in the first internal communication address field.

10. The area network system according to claim 7, wherein after the internet communication address data, a second internal network communication address data of the at least one internal network communication address data and a second connecting port data of the at least one connecting port data are received by the connection module, the connection module assigns the internet communication address data and the second connecting port data to a second external communication address field of the communication address look-up table and assigns the second internal network communication address data and the second connecting port data to a second internal communication address field of the communication address look-up table, wherein the second external communication address field corresponds to the second internal communication address field, and the second internal network communication address data and the second connecting port data correspond to a second passive electronic device of the at least one passive electronic device.

11. The area network system according to claim 10, wherein after the control command is received by the network router, the network router searches the second external communication address field from the communication address look-up table according to the internet communication address data and the second connecting port data and searches the second internal communication address field corresponding to the second external communication address field from the communication address look-up table, wherein the network router issues the control command to the second passive electronic device according to the second internal network communication address data and the second connecting port data in the second internal communication address field.

12. The area network system according to claim 7, wherein the connection module is a software component included in a first passive electronic device of the at least one passive electronic device or a second passive electronic device of the at least one passive electronic device.

\* \* \* \* \*